United States Patent [19]

Fukushima

[11] Patent Number: 5,742,323
[45] Date of Patent: Apr. 21, 1998

[54] IMAGE FORMING APPARATUS WITH PULSE WIDTH MODULATED LASER DRIVER

[75] Inventor: Satoru Fukushima, Kawasaki, Japan

[73] Assignee: Canon Kabushiki Kaisha, Tokyo, Japan

[21] Appl. No.: 13,803

[22] Filed: Feb. 4, 1993

[30] Foreign Application Priority Data

Feb. 6, 1992 [JP] Japan .................... 4-021046

[51] Int. Cl.⁶ .............. B41J 2/47; B41J 2/435; G02B 26/02; G03B 27/72
[52] U.S. Cl. .................. 347/246; 347/252; 347/144; 358/298
[58] Field of Search .................... 346/108, 160; 358/298; 347/246, 236, 209, 252, 251, 253, 240, 131, 132, 143, 144

[56] References Cited

U.S. PATENT DOCUMENTS

| | | |
|---|---|---|
| 4,800,442 | 1/1989 | Riseman et al. .................. 358/298 |
| 4,837,787 | 6/1989 | Takesue et al. .................. 347/246 |
| 4,862,289 | 8/1989 | Shimada .......................... 358/298 |
| 5,153,609 | 10/1992 | Ando et al. ..................... 347/252 |

*Primary Examiner*—Benjamin R. Fuller
*Assistant Examiner*—Raquel Yvette Gordon
*Attorney, Agent, or Firm*—Fitzpatrick, Cella, Harper & Scinto

[57] ABSTRACT

An image forming apparatus which can form gray-scale images comprises a pulse width modulation device for outputting a pulse width modulation signal according to image data, a light emitting device for emitting modulated light in response to the pulse width modulation signal outputted from the pulse width modulation device, a detecting device for detecting quantity of the modulated light, a current control device for controlling, at a time when the light emitting device emits modulated light continuously, current to be supplied to the light emitting device in accordance with the quantity of light detected by the detecting device, and a condition control device for controlling a condition of the pulse width modulation device according to the quantity of light detected by the detecting device at a time when the light emitting device emits the modulated light according to the pulse width modulation signal.

10 Claims, 12 Drawing Sheets

IMAGE FORMING APPARATUS WITH PULSE WIDTH MODULATED LASER DRIVER

BACKGROUND OF THE INVENTION

1. Field of the Invention

The present invention relates to an image forming apparatus for obtaining images by electrophotographic process by scanning photosensitive materials with a laser beam in raster scan method.

2. Description of the Related Art

An image forming apparatus is known for making output power of the laser beam stabilized with respect to the temperature change in forming latent images by scanning the photosensitive materials with the laser beam in raster scan method. Such an image forming apparatus performs automatic power control (APC), that is, a control in which the power of the laser beam is controlled to be equal to a set value by means that the output power of the laser beam once in a single horizontal or vertical scanning operation of the laser beam by an optical-output detector, and then feed back the detected output signal to a laser driving circuit.

As for an Apc circuit, the following circuits are known. One is a circuit in which the detected output signal from the optical-output detection circuit is fed back to LED light-emitting region current (bias current) for the laser beam. Another is a circuit in which the detected output signal from the optical-output detection circuit is fed back to the laser light-emitting region current (drive current) for the laser beam.

In general, the output power of the laser beam can be controlled by parallel shifting of a curve defined between two parameters, the electric current and the output of the laser beam as shown in FIG. 6 in response to the laser temperature change. In case of the laser bias current control circuit, as a gradient of the electric current versus the output of the laser beam curve for the laser light-emitting region is reduced according to the laser temperature change, the bias current value is shifted from the value in the LED light-emitting region to the value in the laser light-emitting region, and hence, the laser beam is emitted to record to a recording medium without supplying recording signals. In such a case, recorded images may be partially covered by ejected toner. For this reason, in order to prevent the bias current value from shifting into the laser light-emitting region even if the bias current is variable in response to the temperature change, a set value for the bias current is determined so as to include the margin, and a difference between a bias current value $I_D$ and a laser light-emitting threshold current value $I_{th}$, $I_{th}-I_{BIAS}$, is made variable in response to the laser temperature.

In the APC circuit, in case that the detected output signal is fed back for controlling the laser drive current (in case that the bias current is not impressed), the laser drive current value is transferred to the laser light-emitting region via the LED light-emitting region when the recording signal is turned on. In contrast, when the recording signal is turned off, the laser drive current value is transferred back to the LED light-emitting region from the laser light-emitting region. In this situation, the rise-up time and the fall-down time of the output of the laser beam are extended to be longer.

In the APC circuit described above, in general, the current value is determined so that the output of the laser beam is equal to a set value in a condition that the laser beam is radiated in succession.

FIG. 12 shows waveforms of laser drive current pulses and laser light-emitting pulses corresponding to turned-on and turned off recording signals, respectively. The wave form of the laser light-emitting pulse is corresponding to that of the laser drive current pulse over the threshold value. Thus, if the rise-up and fall-down characteristics of the laser drive current pulse during turning on and off of the recording signal change, the wave form of the laser light-emitting pulse changes according to the characteristics and the intensity of the output of the laser beam changes too. Such change of the intensity brings inferior images, because gray-scale linearity worsens in a case that pulse duration of laser beam is modulated according to the gray-scale of image data, as shown in U.S. Pat. No. 4,800,442.

In short, the rise-up and fall-down characteristics of the laser drive current pulse which effects laser light-emission, changes especially as the threshold current $I_{th}$ changes due to the temperature change of the laser beam. As a result, the problem is that the intensity of the laser beam modulated by the recording signal changes even if APC is used. The fluctuation of the intensity of the laser beam is emerged specifically in case (of low density part) that the pulse width of the laser drive signal is very short in comparison with the frequency of the recording signal or in case (of high density part) that the laser drive signals are repeated almost continuously, and hence, the problem is that such an APC circuit is not adequate for recording high-density and multiple-gray-scaled images.

SUMMARY OF THE INVENTION

An object of the present invention is to provide an image forming apparatus enabling to develop high-quality recorded images by reducing the change of the intensity of the laser beam modulated by the recording signal.

According to the present invention, there is provided an image forming apparatus comprising:

pulse width modulation means for outputting a pulse width modulation signal according to image data;

beam emitting means for emitting a beam in response to the pulse with modulation signal outputted from the pulse with modulation means;

detecting means for detecting quantity of light of the beam emitted from the beam emitting means;

current control means for controlling to set level of a current to be impressed to the beam emitting means according to the quantity of light detected by the detecting means while the beam emitting means emits the beam continuously; and condition control means for controlling a condition of the pulse width modulation means according to the quantity of light detected by the detecting means when the beam emitting means emits the beam according to the pulse width modulation signal corresponding to representing predetermined gradation.

According to the present invention, light quantity of beam is controlled using not only pulse width modulation for record signal but also driving current adjustment for laser as beam emitting means so that even if change of laser temperature brings change of beam power, the beam power can be modified in a stable direction.

The above and other objects, effects, features and advantages of the present invention will become more apparent from the following description of embodiments thereof taken in conjunction with the accompanying drawings.

DETAILED DESCRIPTION OF A PREFERRED EMBODIMENTS

In the followings, by referring to accompanying drawings, embodiments of the present invention are more fully described in the detailed description.

<The first embodiment>

Figure 1:
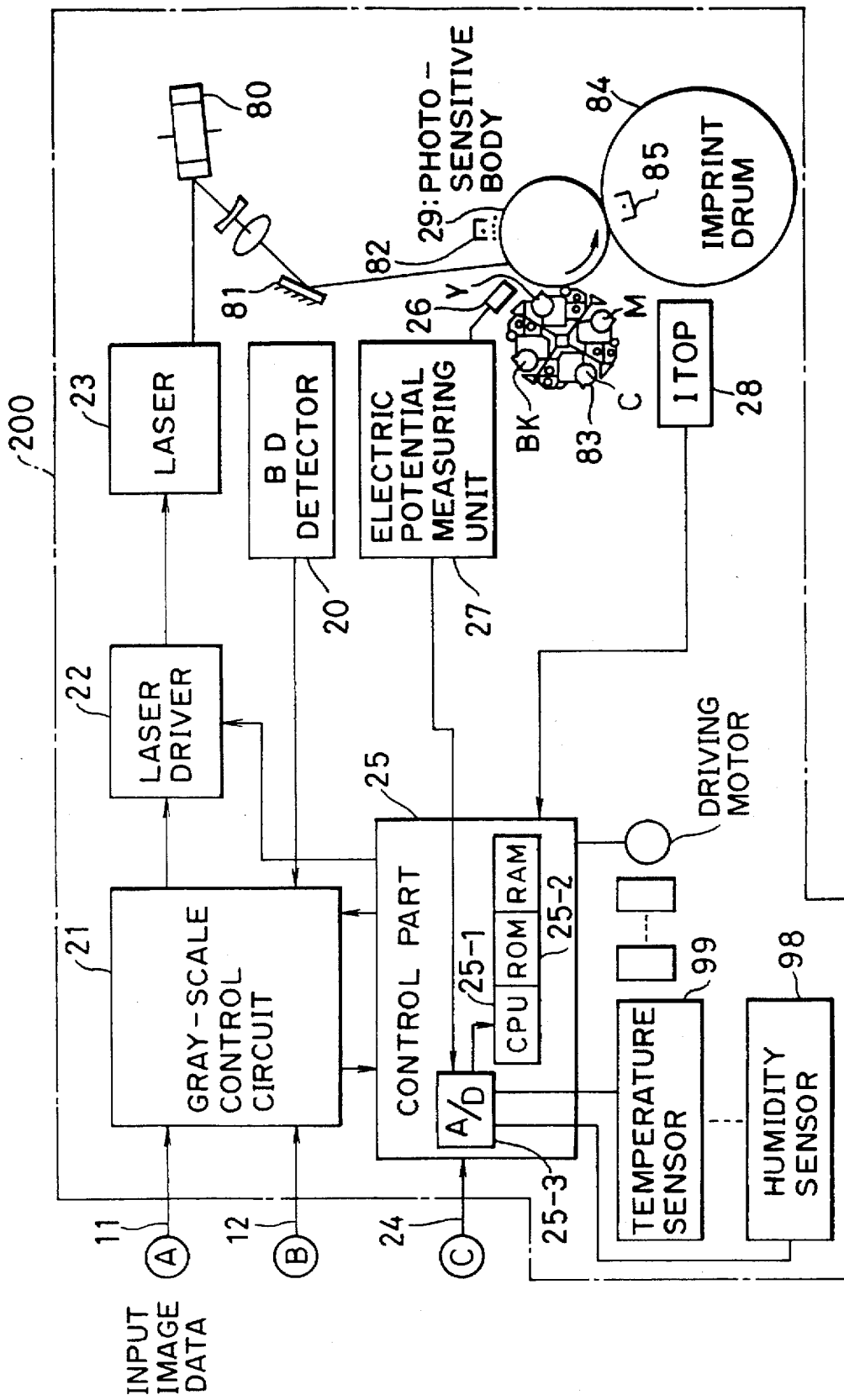
FIG. 1 is a block diagram showing a circuit system of a color printer using the present invention.

FIG. 1 shows a major circuit structure of the control system of the color printer of this embodiment.

In FIG. 1, input image data 11 are supplied at "A" into the gray-scale control circuit 21 of the printer part Selection signal 42 is set to select input B of selector 40 so as to accept a pattern from pattern generator 40a, which is generated under control of CPU 25-1 in synchronism from horizontal synchronization signal HSYNC and an ITOP signal from ITOP detector 28 200. As an image clock rate 12, which is supplied at "B" of the reader part (not shown) and an image clock rate of the printer part 200 for defining images are not identical to each other, the gray-scale control circuit 21 has a function for synchronizing these two image clocks and a function for matching the input image data to density data for color reproduction used at the printer part 200. The output data from the gray-scale control circuit 21 are transferred into a laser driver 22 in order to drive a laser 23 and develop images.

A control part 25, which exchanges information with the reader part through a communication control line 24, which is supplied at "C" controls each control elements including a driving motor in the printer part 200. Control part 25 includes analog-to-digital converter (A/D) 25-3, an unlabelled random access memory (RAM), read only memory (ROM) 25-2, and CPU 25-1. A component 26 is an electric potential sensor for detecting the electric charge charged at the photosensitive body 29. Component 27 is an electric potential measuring unit for transforming the output signals from the electric potential sensor 26 into digital signals and supplying them into the control part 25.

The electric potential data supplied into the control part 25 are read by CPU 25-1 in the control part 25 and used for image recording control. On the other hand, a signal from a sensor 28 for detecting an image top signal (ITOP) is supplied to the control part 25 and used for image recording control.

Color image data supplied from the reader part are processed with pulse width modulation (PWM) and so on, and finally drive the laser. The laser light modulated in response to the image data is scanned at a high speed by scanning means which in this embodiment is a polygon mirror 80 rotating in a high speed. The scanned light is reflected by a mirror 81 and projected as a dot onto a surface of a photosensitive body 29, which in this embodiment is drum-shaped, corresponding to the image data. A single horizontal scanning by the laser light corresponds to single horizontal scanning of images. An this embodiment, the scanning width is 1/16 mm, and synchronism from each scan-line to the next is accomplished via beam detect ("BD") detector 20.

The laser light is scanned on the surface of the photosensitive drum 29 in the direction of the horizontal scanning, and as the photosensitive drum 29 rotates in a constant rotational velocity in the direction of the vertical scanning, an image is developed on the surface of the photosensitive drum 29 continuously. The surface of the photosensitive drum 29 is charged uniformly by a charger 82 before the exposure of laser light, and the charged photosensitive drum 29 is exposed by the laser light to form latent images on the surface of the photosensitive drum 29. Latent images each of which is formed according to each color signal converted visible images by rotating developing vessels 83 each of which corresponds to each color.

For example, in relation to a first scanning operation of a manuscript in the color reader, first, dot images corresponding to a spectrum component of yellow color are recorded on the photosensitive drum 29 and developed into the visual images by the developing vessel Y for yellow color.

Second, these yellow images with yellow toner are transferred onto a sheet wrapped around an imprint drum 84 at the contact line between the imprint drum 84 and the photosensitive drum 29 by the imprint charger 85. Same procedures with as this are repeated for individual colors of magenta ("M"), cyan ("C") and black ("BK"), and then, fully-colored images with four color components can be formed on the sheet by means that multiple images of individual colors are superposed onto the same sheet.

Figure 2:
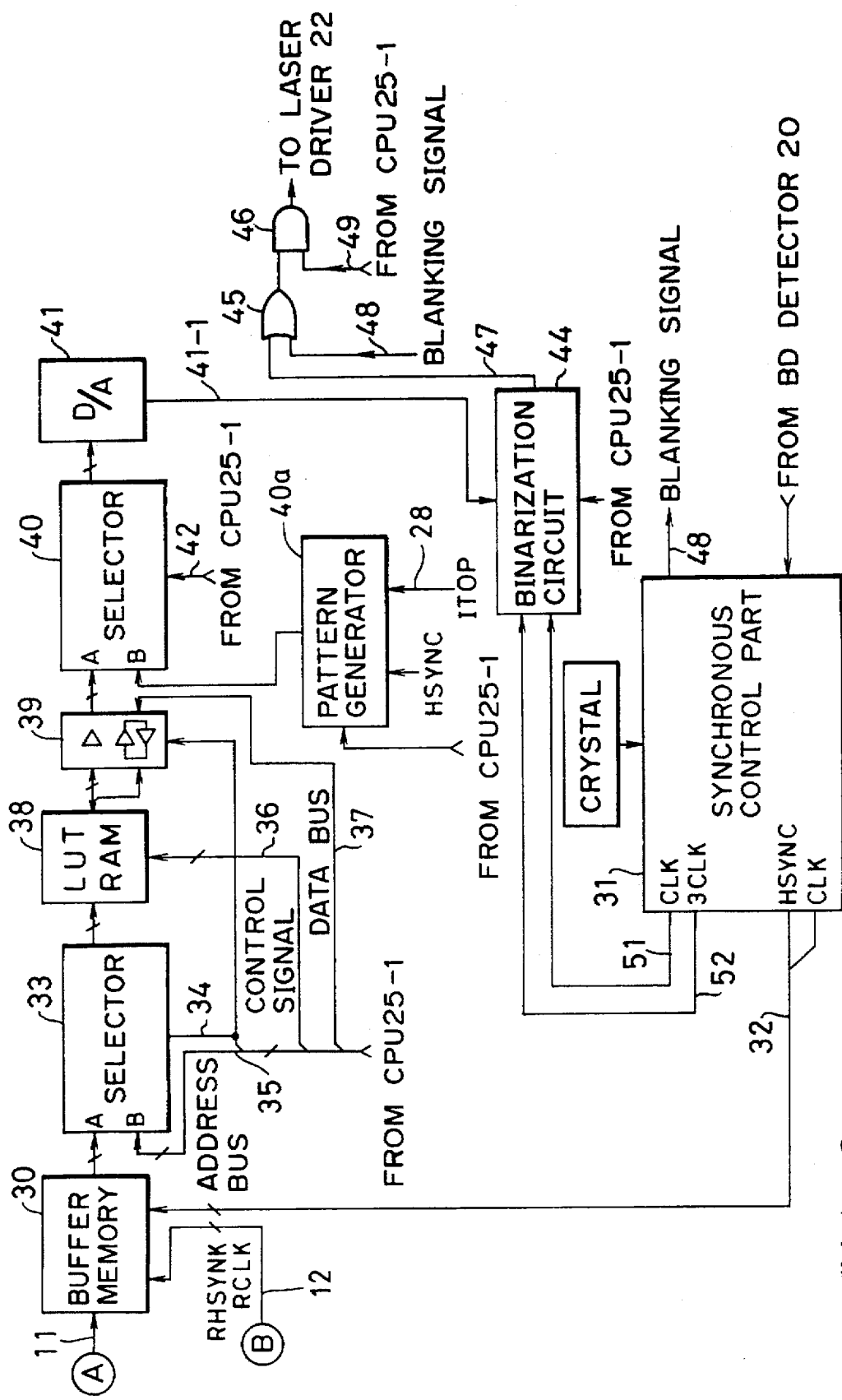
FIG. 2 is a block diagram showing a structure of the gray-scale control circuit 21 in FIG. 1.

FIG. 2 is a block diagram showing a structure of the gray-scale control circuit 21 in FIG. 1.

8-bit image data 11 output from the reader part are supplied at "A" into a buffer memory 30 simultaneously with a synchronous signal 12 RHSYNC supplied at "B" by a synchronous signal processing part of the reader part and the image clock RCLK. The image data stored in the buffer memory 30 are read out from the buffer memory 30 simultaneously with synchronous signals 32 HSYNC and CLK given by a synchronous control part 31 which generates these signals by reference to a CRYSTAL and which also outputs a 3CLK signal 52 which is at a rate of three times that of CKL. With this operation, the synchronous difference between the reader part and the printer part 200 is adjusted and the transfer speed of the image data is converted, and thus, the image data stored in the buffer memory 30 is put out to a selector 33.

Selection signal 34 is set to select input B of selector 33 so as to input addresses from address bus 35 to LUTRAM 38, which CPU 25-1 uses in conjuction with data on data bus 37 to store values into LUTRAM 38.

When a selection signal 34 from the CPU 25-1 of the control part 25 selects an input A of a selector 33, the image data are inputted into an address of a look-up table RAM (LUTRAM) 38 used for image data correction. In this time, if the CPU 25-1 enables LUTRAM 38 to be accessible for reading by a control signal 36, the LUTRAM 38 outputs data corresponding to the input address. The output data from the LUTRAM 38 are supplied to a selector 39, and then forwarded to the next selector 40 in response to the selection signal 34. When a selection signal 42 of the selector 40 selects an input A, the above described image data are further forwarded to a D/A converter 41 and converted into an analog image signal 41-1.

The converted analog image signal 41-1 is binarized by a binarization circuit 44.

Selection signal 42 is set to select input B of selector 40 so as to accept a pattern from pattern generator 40a, which is generated under control of CPU 25-1 in synchronism from horizontal synchronization signal HSYNC and an ITOP signal from ITOP detector 28.

Figure 3:
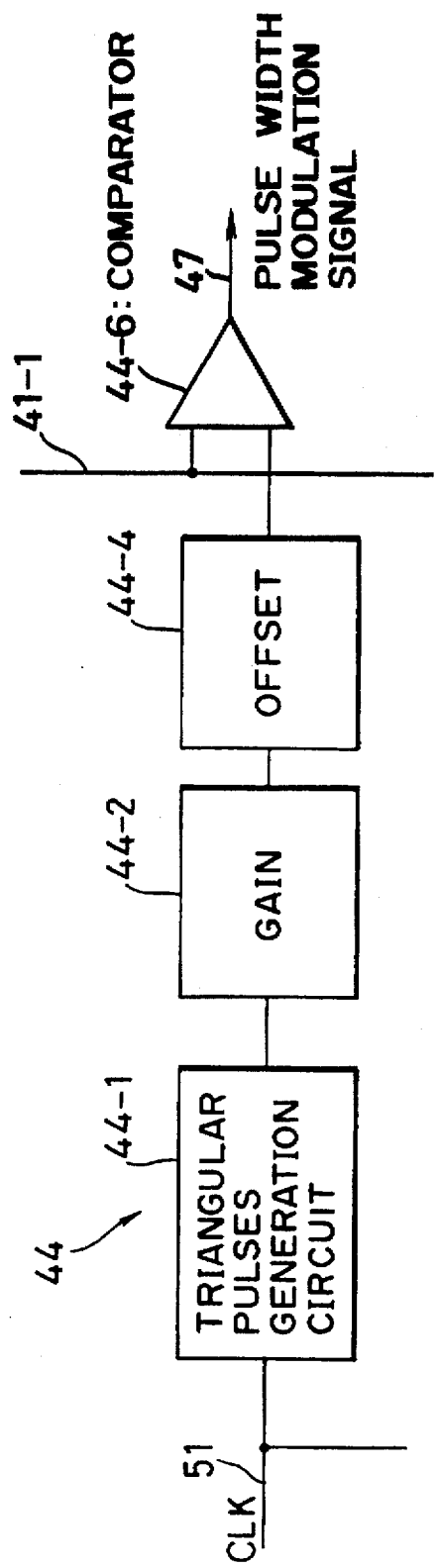
FIG. 3 is a block diagram showing a structure of a binarization circuit 44 shown in FIG. 2.

A part of the binarization circuit 44 related to the binarization operation is shown in FIG. 3. In FIG. 3, a triangular pulse generation circuit 44-1 generates triangular pulses on a basis of a CLK signal 51 supplied from the synchronous control part 31. The gain and offset level of the triangular pulse are defined in the circuits 48-8 and 44-9 (see FIG. 5), respectively, and are applied by circuits 44-2 and 44-4, respectively. By means that an output signal from the circuit 44-4 is compared with the analog image signal 44-1 by a comparator 44-6, the pulse width modulation (PWM modulation) is applied, and then, its output signal is further forwarded to the selector −0 (not shown).

Figure 4:
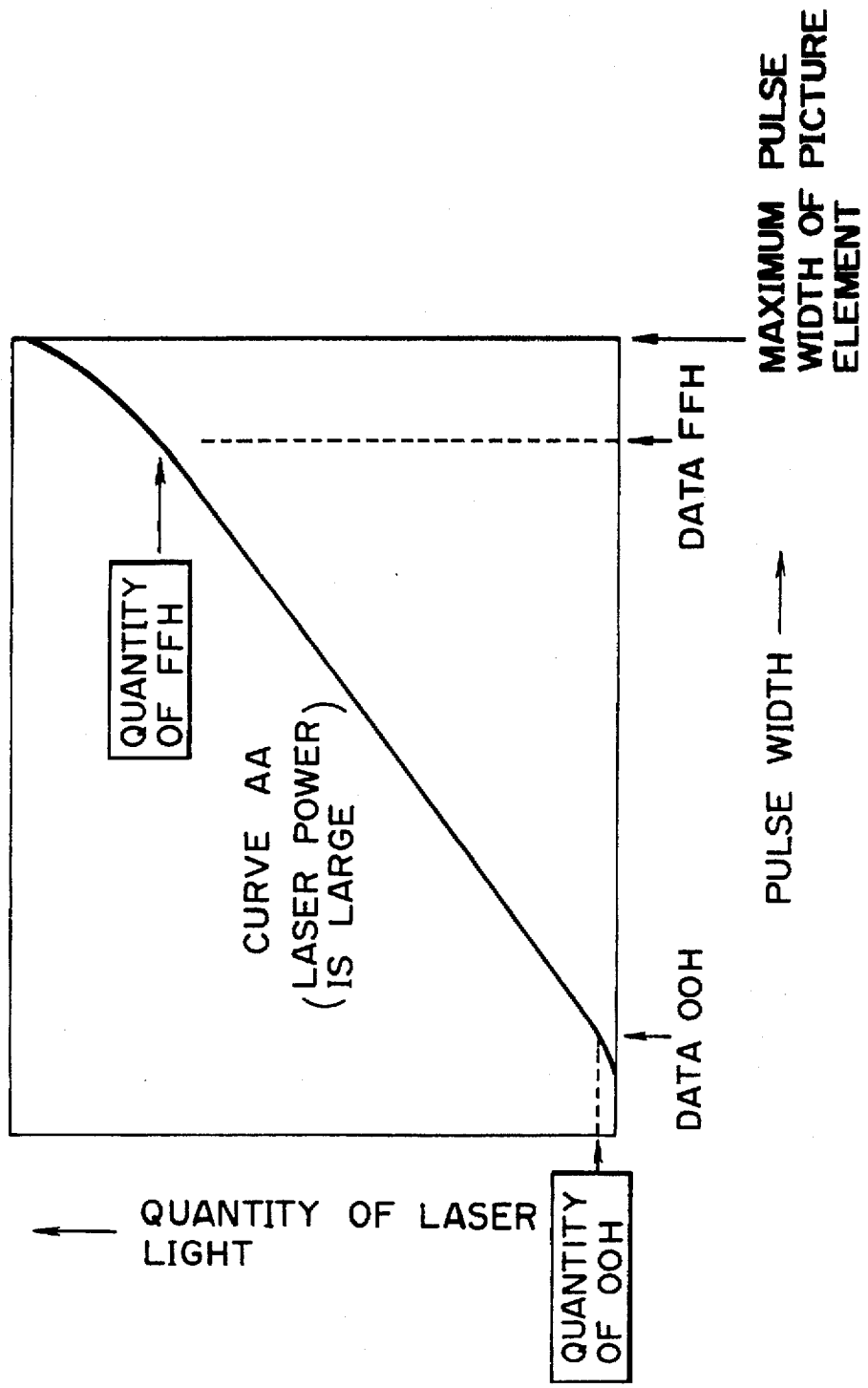
FIG. 4 is a characteristic curve showing a relationship between the pulse width of a driving pulse and the intensity of a laser light-emission.

The relationship between the pulse width of the pulse put out from the binarization circuit 44 and the quantity of laser light-emission is the characteristic curve AA shown in FIG. 4. The image data range is defined between 00H and FFH (hexadecimal number). In order to use effectively the linear part of the characteristic curve, the 00H of the image data is assigned to the quantity of laser light-emission at the beginning of the linear part of the curve, and FFH of the image data is assigned to the quantity of laser light-emission at the end of the linear part of the curve. In order to establish such a characteristic for the constant quantity, the above described gain and offset level are adjusted by using an apparatus measuring the quantity of laser light-emission energy in the laser light path.

The image data 47 processed with the pulse width modulation in the binarization circuit 44 are put out to a laser driver 22 via an OR circuit 45 and an AND circuit 46, controlled respectively by blanking signal 48 (from synchronous control part 31) and signal 49 from CPU 23-1.

Figure 5:
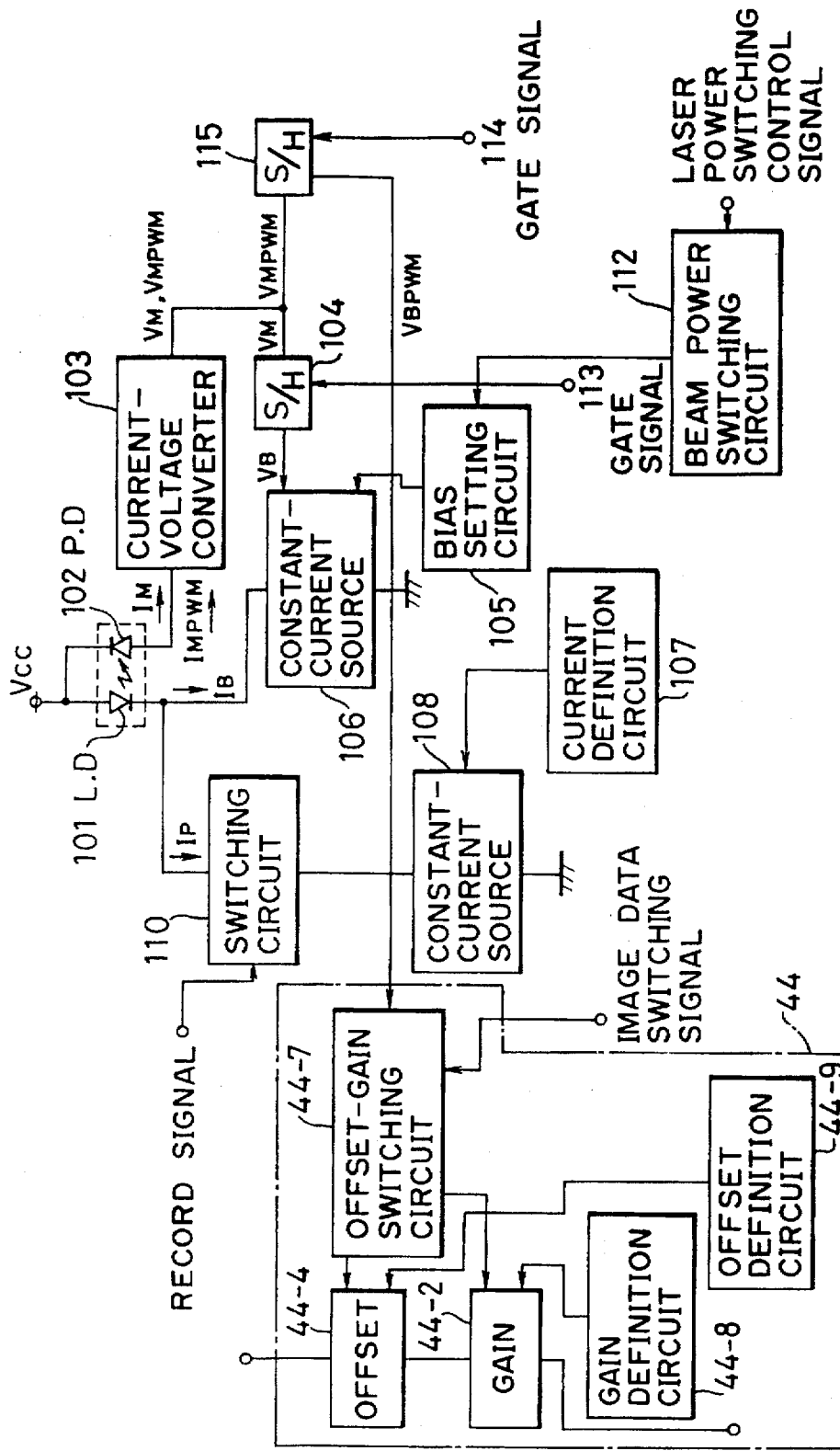
FIG. 5 is a block diagram of a circuit structure of the laser driver 22 in FIG. 1.

A circuit structure of the laser driver 22 in FIG. 1 is shown in FIG. 5.

The record signal forwarded from the AND circuit 46 of the gray-scale control circuit 21 is supplied into the laser driver 22. By scanning the laser beam projecting continuously from a laser diode (L.D.) 101 onto the outside of the recording area, the intensity of the laser beam is measured by light quantity detecting means such as photo diode (P.D.) 102 and a monitor current ($I_M$) is obtained. The monitor current is converted into a voltage ($V_M$) by a current-voltage converter 103, and next, sampled with a gate signal 113 in a sample hold (S/H) circuit 104, where a sample level ($V_B$) is held for at least one horizontal scanning period. This output signal $V_B$ is forwarded to a constant-current source 106 which also receives an output signal from a bias setting circuit 105.

If the intensity of laser beam is less than a designated value, the monitor current $I_M$ gets too small; and the S/H output level also gets too small, and hence, the constant-current source 106 tries to increase its output current value according to the bias current value defined by the bias setting circuit 105.

If the intensity of laser beam is greater than a designated value, the monitor current gets too great and the S/H output level also gets too great, and hence, the constant-current source 106 tries to decrease its output current value according to the bias current value defined by the bias setting circuit 105.

Figure 6:
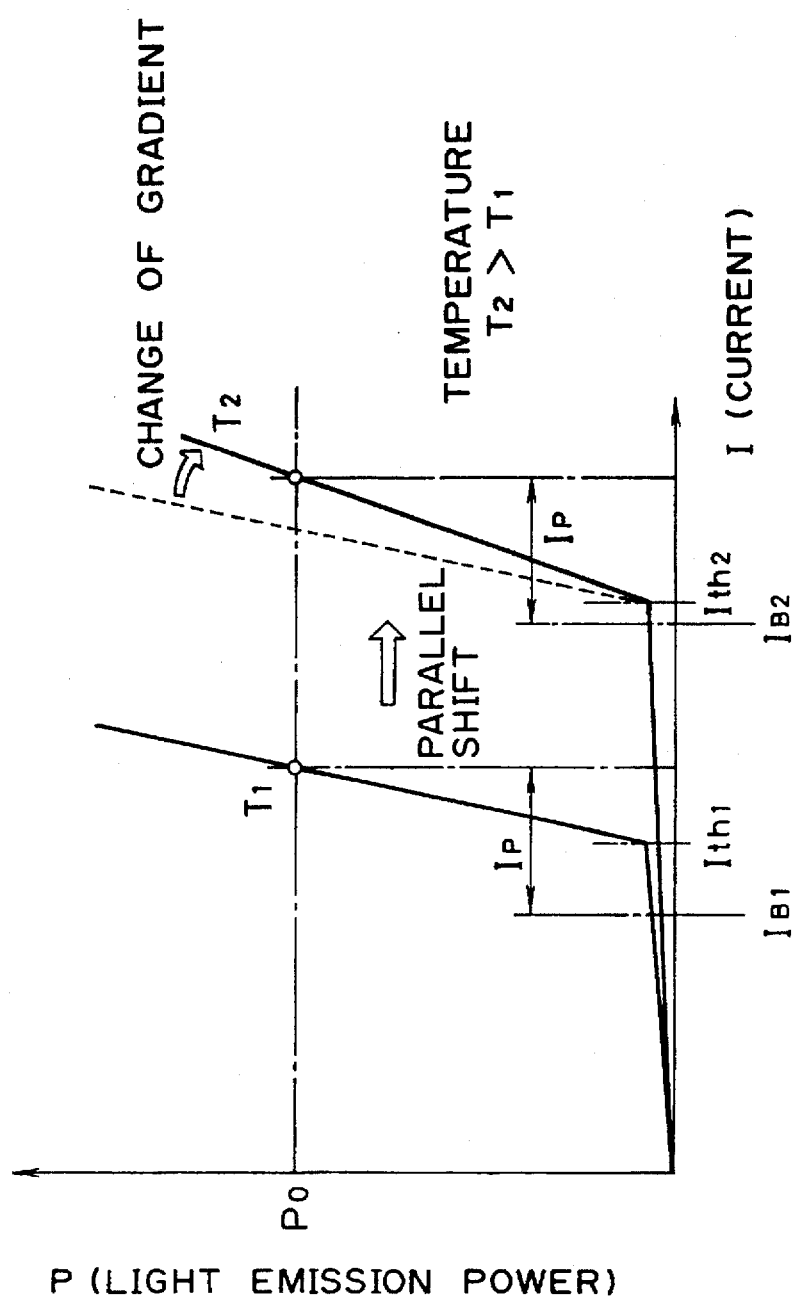
FIG. 6 is a temperature characteristic curve showing a relationship between the electric current and the light-emission intensity of a semi-conductor laser.

These operations are aimed in order to change the total bias current from $I_{B1}$ to $I_{B2}$ when the temperature of the semiconductor laser increases from $T_1$ to $T_2$ ($T_2 > T_1$) in FIG. 6, and hence, the bias current in the LED light-emission region is controlled for the shift of the characteristic curve representing the relation between the current and the light-emission power of the semi-conductor laser due to the temperature change.

And next, the record signal (the image data) are put into a switching circuit 110, and then an active current in the laser light-emission region is turned on and off. The active current $I_P$ is defined by means that the output signal from an active current definition circuit 107 is put into the constant current source 108. A characteristic of the relationship between the current and the light-emission power of the semi-conductor laser is shown in FIG. 6.

As found in FIG. 6, the bias current $I_B$ changes so that the quantity of laser light-emission may not change in response to the temperature change of the laser, and furthermore, the gradient of the curve of the versus —the light-emission power also changes in response to the temperature change of the laser. Therefore, the difference, $I_{th} - I_B$, between the threshold current of the laser light-emission $I_{th}$ and the bias current $I_{BIAS}$, changes. As a result, the rise-up and fall-down characteristic of the pulse waveforms of the laser driving current changes, and, since in response to this, the pulse waveforms of the laser light-emission also changes, the intensity of the laser beam after processing of the pulse width modulation (PWM) changes, too.

Figure 7:
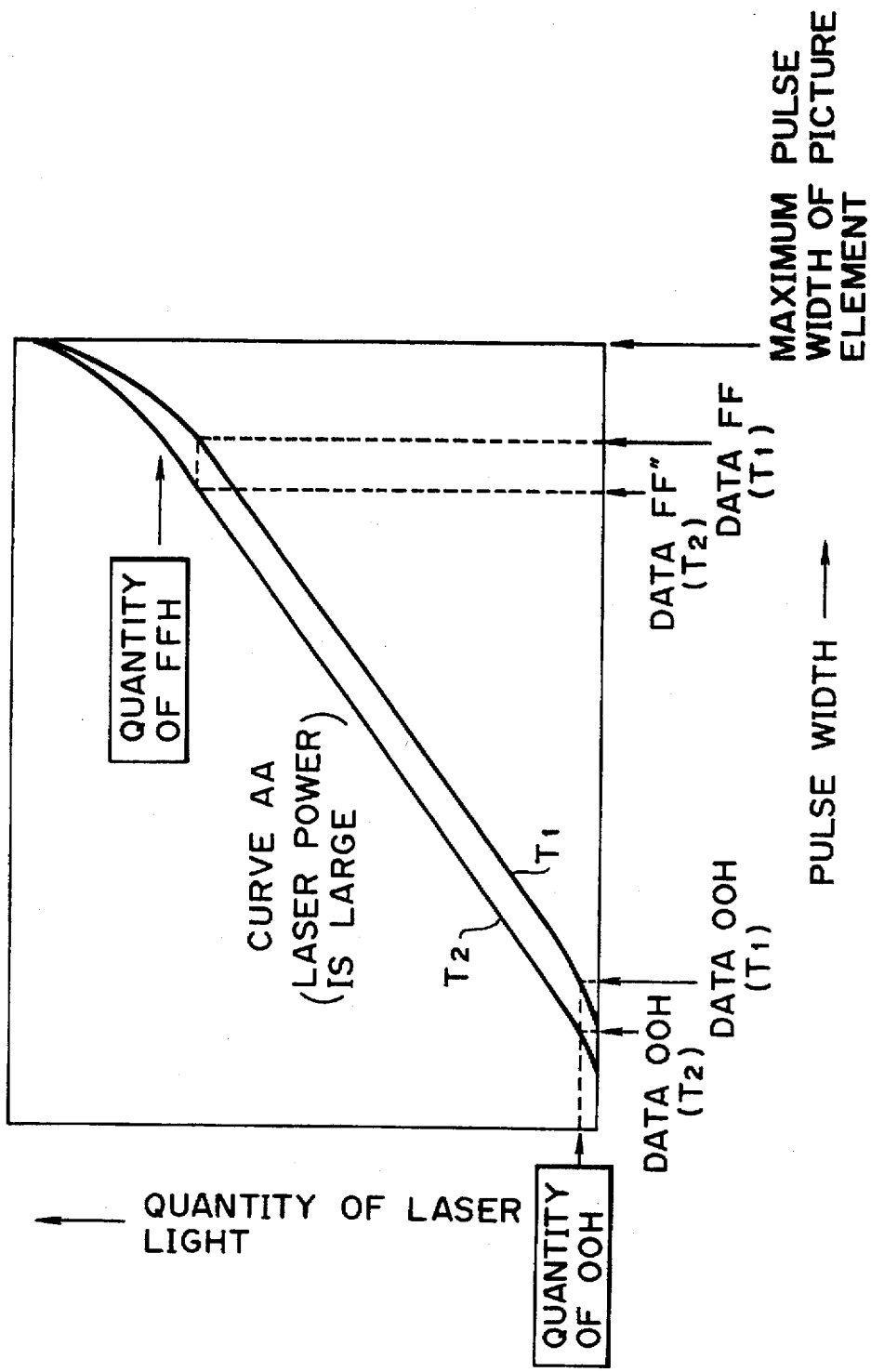
FIG. 7 is a characteristic curve showing a relationship between the pulse width and the quantity of laser light in response to the laser temperature.

FIG. 7 shows a curve "AA" representing relationship between the pulse width of the recording signal and the quantity of the laser light.

In case that the laser temperature changes from $T_1$ to $T_2$, and in response to this, the bias current and the threshold current change from $I_{B1}$ to $I_{B2}$, and from $I_{th1}$ to $I_{th2}$, respectively, the pulse width of the recording signal is processed by the pulse width modulation in accordance with the characteristic curve shown in FIG. 6.

As found in FIG. 7, the linearity of the relationship between the pulse width of the recording signal and the quantity of laser light-emission is lost as the laser temperature changes, especially near 00H level and FFH level of the image data. Eventually, regarding formed image, due to the laser temperature change, degradation phenomenon with respect to the reproduction of gray-scale levels, such as lack or overlap in a high light part, transformation of dots or reduction of the density in a high density part, occurs.

In order to prevent occurrence of the above described problems, in this embodiment, the intensity of the laser beam is controlled when the laser diode (L.D.) continuously emits the laser light, and also the intensity of the laser beam processed in the pulse width modulation according to the recording signal. In the following, this control method is described.

In this embodiment, by scanning outside of the recording area by one laser beam, which correspond to 00H and FFH data and is among the laser beams processed with pulse width modulation according to 00H~FFH of image data as recording signal, the intensity of the laser beam after processing with pulse width modulation is detected at a photo diode (P.D. 102) and the monitor current ($I_{MPWM}$) is obtained. This monitor current is converted into a voltage ($V_{MPWM}$) by a current-voltage converter 103. So far, the voltage ($V_{MPWM}$) is put out according to the average intensity of the laser beam processed with the pulse width modulation.

Next, the voltage ($V_{MPWM}$) is sampled with the gate signal 114 in the sample hold (S/H) circuit 115 and its sample level is held. The output signal $V_{BPWM}$ from the sample hold circuit 115 is forwarded to the binarization circuit 44. In case that beam power corresponding to the image data at 00H and FFH processed with the pulse width modulation is less than a designated value, the monitor current gets too small and the S/H output level also gets too small, and hence, the binarization circuit 44 tries to increase the previously determined offset and gain level.

In case that the beam power corresponding to the image data at 00H and FFH processed with the pulse width modulation is greater than a designated value, the monitor current gets too great and the S/H output level also gets too great, and hence, the binarization circuit 44 tries to decrease the previously determined offset and gain level. These operations mean that in FIG. 7, when the temperature of the semi-conductor laser increases from T1 to T2 the pulse width at 00H and FFH of the recording signals, which are processed with the pulse width modulation, varies. Therefore, the change of the pulse waveforms of the light-emission of the semi-conductor laser due to the temperature change, the change of the quantity of laser light-emission processed with the pulse width modulation and the change of the linearity in the characteristic of the quantity of the laser light-emission to the recording signal are correctively controlled.

Figure 8:
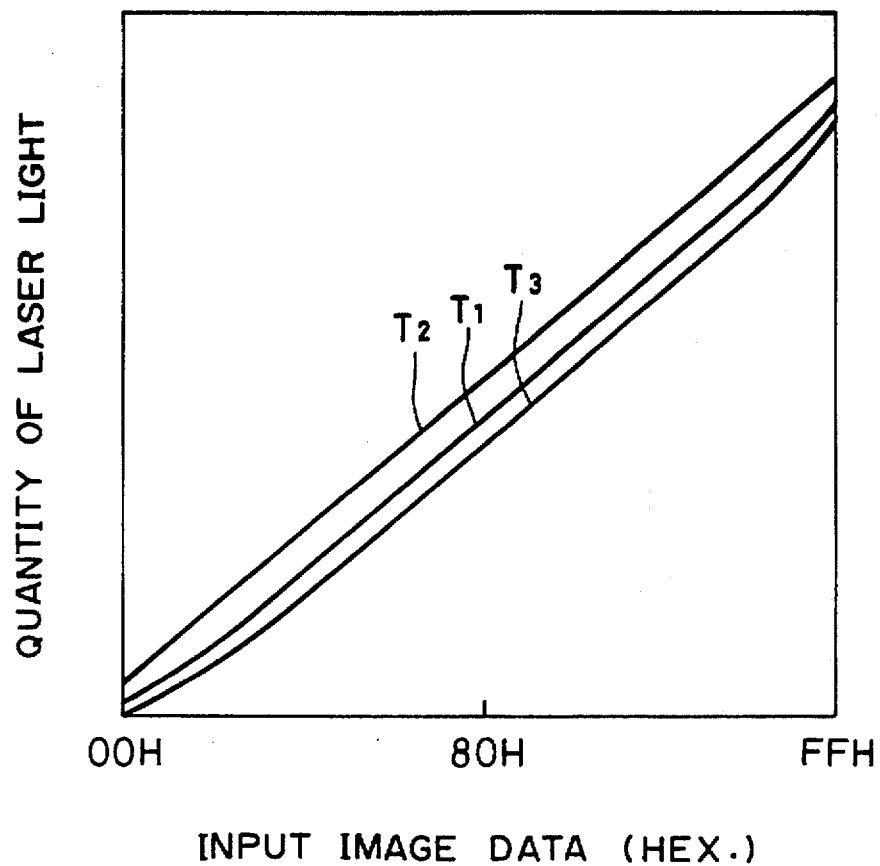
FIG. 8 is a characteristic curve showing the quantity of laser light in response to the input signal level.

FIG. 8 shows a characteristic curve of the quantity of laser light-emission processed with the pulse width modulation to the input recording signal level As found in FIG. 8, without the above described corrective control, when the temperature of the semi-conductor laser changes from T1 to T2 or T3 (T1 <T2, T1 >T3), the above described characteristics with respect to both of the quantity value of light-emission power and the linearity change, and as a result a drastic change in the density of the recorded image and the separation of gray-scale levels is caused. However, with the above described corrective control in this invention, it will be appreciated that the above characteristic changes can be corrected and that what can be obtained is a stable output image without changes in the density of the recorded image and the separation of gray-scale levels and so on.

In the image forming apparatus in the first embodiment as shown in FIG. 1, the apparatus is so formed that a latent image is formed by exposing the light onto the surface of the photosensitive drum and that the latent image can be transformed into the visualized image by developing the formed latent image with development solutions.

Generally, the sensitivity of the photosensitive drum is not stable due to the change of the atmospheric environment and the degradation of the materials used in the photosensitive materials.

In order to control the surface condition of the photosensitive drum, a surface condition sensor, such as detector 26, is arranged to measure the surface condition of the photosensitive drum on an adequate timing and surface condition is controlled to vary the grid voltage applied to the corona charger and the exposure energy when exposing the laser light onto the photosensitive drum, in response to the measured value of the surface condition sensor.

In addition, in the first embodiment, in order to maintain the density of the recorded images stably, the recording conditions are adjusted in response to the atmospheric temperature and humidity, which is measured by a temperature-humidity detection means especially added onto the image forming apparatus.

<Second embodiment>

The present invention is also effective in another type of image recording apparatus where the recording light-emission intensity as one of the recording conditions is changed in accordance with an environmental condition. For example, in an apparatus wherein recording dot density is changed, the beam power may be changed in accordance with the recording dot density (for instance, U.S. Pat. 4,862,289). In such a case, this embodiment is applicable.

In the following, by referring to drawings, the second embodiment will be described in detail.

Figure 9:
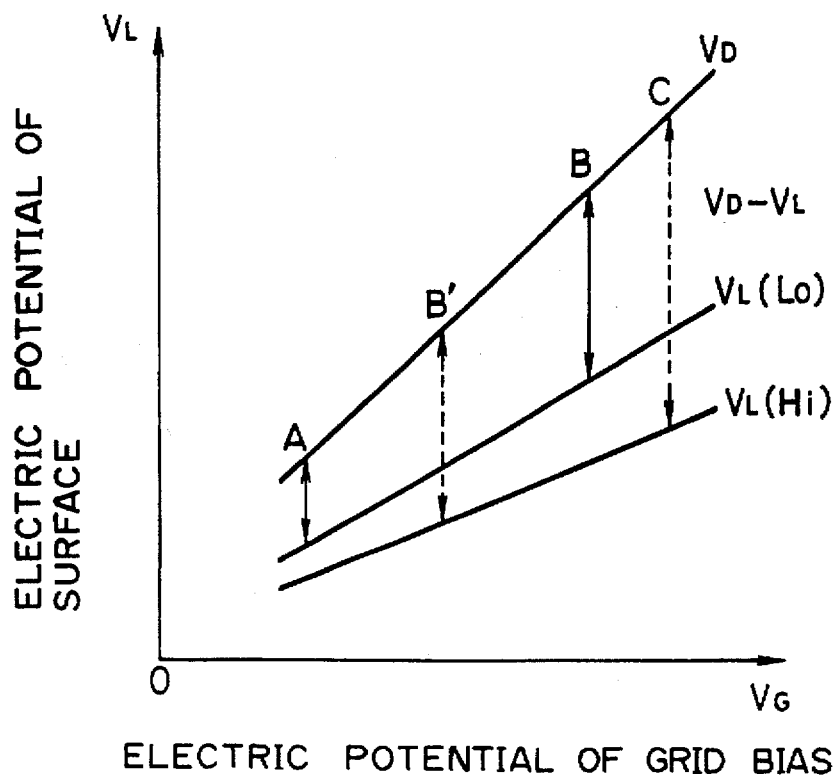
FIG. 9 is a characteristic curve used for controlling voltages.

FIG. 9 shows a characteristic curve being used in an image forming apparatus wherein the definition of the image recording condition is performed by controlling the grid voltage of the corona charger, and is switched to controlling by the quantity of exposure light when the grid voltage gets to be greater than a designated value.

This is the characteristic curve used for controlling the electric potential contrast on the surface of the photosensitive drum as a recording image condition, where the grid bias is changed during a time when the quantity of exposure light is constant so that an exact value of the grid bias may be estimated in order to define a necessary V contrast (VD–VL) by specifying the surface electric potential ($V_D$) of the photosensitive drum.

Figure 10:
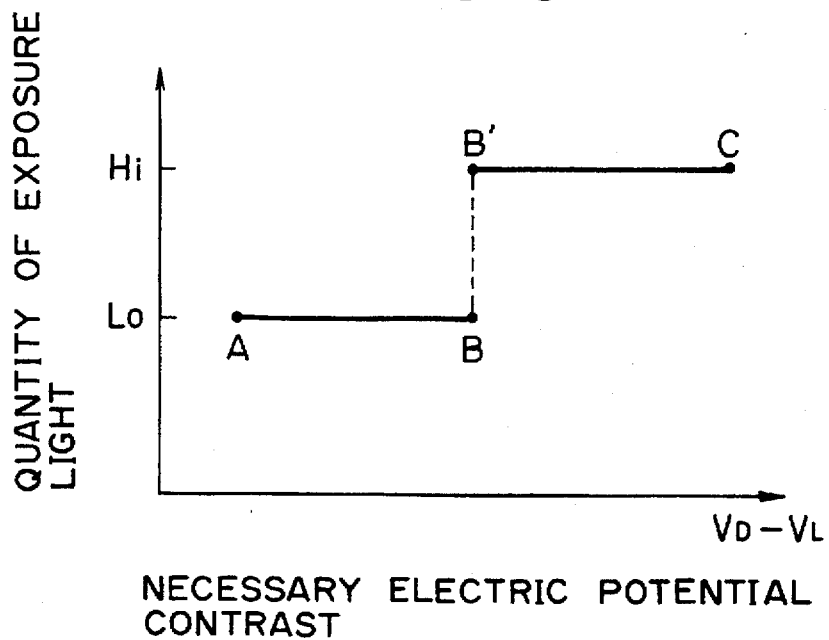
FIG. 10 is a switching scheme for the quantity of laser light.

If the necessary V contrast (VD–VL) changes in a wider range, a single quantity of exposure light can not supply such a wide range of the value of V contrast. Hence, this embodiment adopts such a control method that the quantity of exposure light is shifted between a higher contrast side and a lower contrast side as shown in FIG. 10. More specifically, if the electric potential contrast is higher than the value for the point B, the quantity of exposure light is shifted from Lo to Hi.

In order to control the electric potential contrast in response to the change of the above quantity of exposure light, the electric potential (VD) on the surface of the photosensitive drum is controlled by varying the grid bias in response to the change of the quantity of exposure light so that the identical electric potential contrast may be obtained for the points B and B' with the different quantity of exposure light.

In the above described control method, for example, in case that the electric potential contrast changes from the lower value at A to the higher value at C, the quantity of exposure light is controlled to change in the locus pattern, A→B→B'→C, and in the contrasting case that the electric potential contrast changes from the higher value at C to the lower value at A, the quantity of exposure light is changed in the locus pattern, C→B'→B→A, and thus, the electric potential contrast can be controlled in a wider range.

In the image recording apparatus using the above described control method, the following problem occurs when switching the quantity of laser exposure light.

Figure 11:
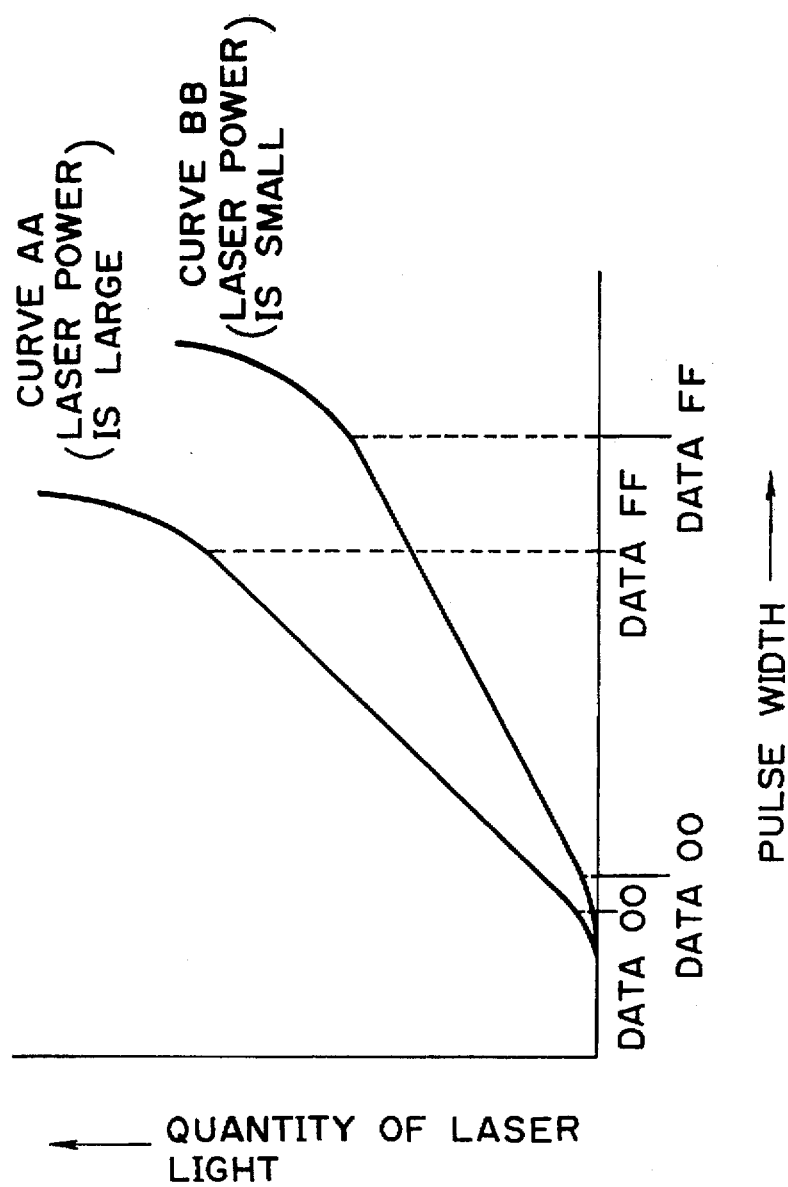
FIG. 11 is a characteristic curve showing a relationship between the pulse width corresponding to an the quantity of laser light and the quantity of laser light after pulse-width modulation.
Figure 12:
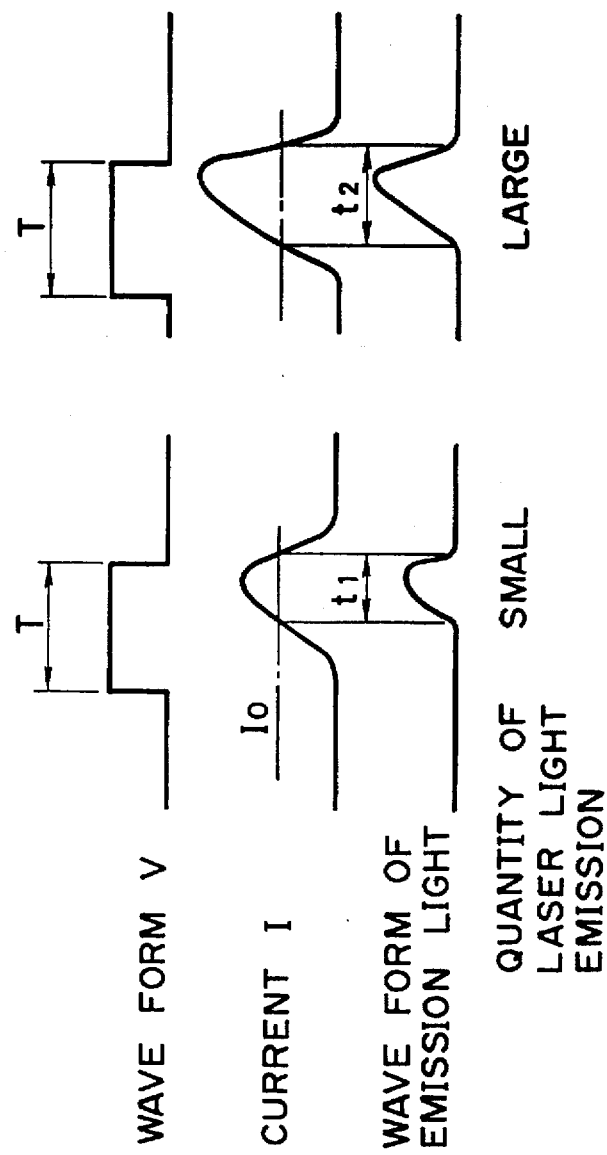
FIG. 12 is a figure showing waveforms of driving electric current and laser light-emission intensity corresponding to recording signal pulses tuned on and off.

In case of recording the latent image on the photosensitive body by changing the quantity of laser light-emission by processing the laser drive signals with the pulse width modulation (PWH) based on the input image signals, the relationship between the pulse width of the laser drive signal and the quantity of laser light-emission is shown in the characteristic curves in FIG. 11.

In FIG. 11, in order to use widely the linear part of these characteristic curves in according to the image data range between level 00H (White part)-FFH (Black part), minimum level 00H of the image data is assigned to the lowest quantity of laser light-emission at the beginning of the linear part of the curve, and maximum level FFH of the image data is assigned to the quantity of laser light emission near the end of the linear part of the curve.

In case of switching the quantity of laser light-emission, as the laser emits light only when the drive current is greater than its threshold current, the quantity of laser light varies as the laser drive current changes even if an identical pulse is supplied. Therefore, when the laser power is switched, in the relation between pulse width, which is supplied to the laser driver, and the quantity of laser light, above linear area varies as if a change of the curves AA and BB as shown in FIG. 11. Here, the curve AA is for a case that the laser power is large, and the curve BB is for a case that the laser power is small.

In this embodiment, in order to prevent the above problem on switching the laser power, a plurality of laser powers are selected adequately, the quantity of laser light-emission is controlled, which is processed in the pulse width modulation by the recording signals, according to the used laser power. In the following, this control method is described.

In the second embodiment, the circuit structure of the control system is similar to that shown in FIG. 1, and in addition, the apparatus with this embodiment has further an electric potential sensor 26 for detecting the electric potential developed on the photosensitive body 29, and a measurement unit 27 for the electric potential for converting the output signal from the electric potential sensor 26 into the digital signal and supplying this digital signal to the CPU 25-1 of the control part 25.

The humidity sensor 98 and the temperature sensor 99 measure the operational condition inside the image forming apparatus and supply measured data into the A/D convertor 25-3 where these data are converted into digital signals to be forwarded into the CPU 25-1. At the CPU 25-1, a necessary electric potential contrast is estimated from these data measured on operational conditions.

Finally, the quantity of laser light is determined from the characteristic curve representing the relationship between the quantity of laser light and the necessary electric potential contrast as shown in FIG. 10, and the electric potential of the photosensitive drum is controlled using the determined quantity of laser light. In this embodiment, 2 (two) steps switching about of the quantity of laser light is performed.

Figure 13:
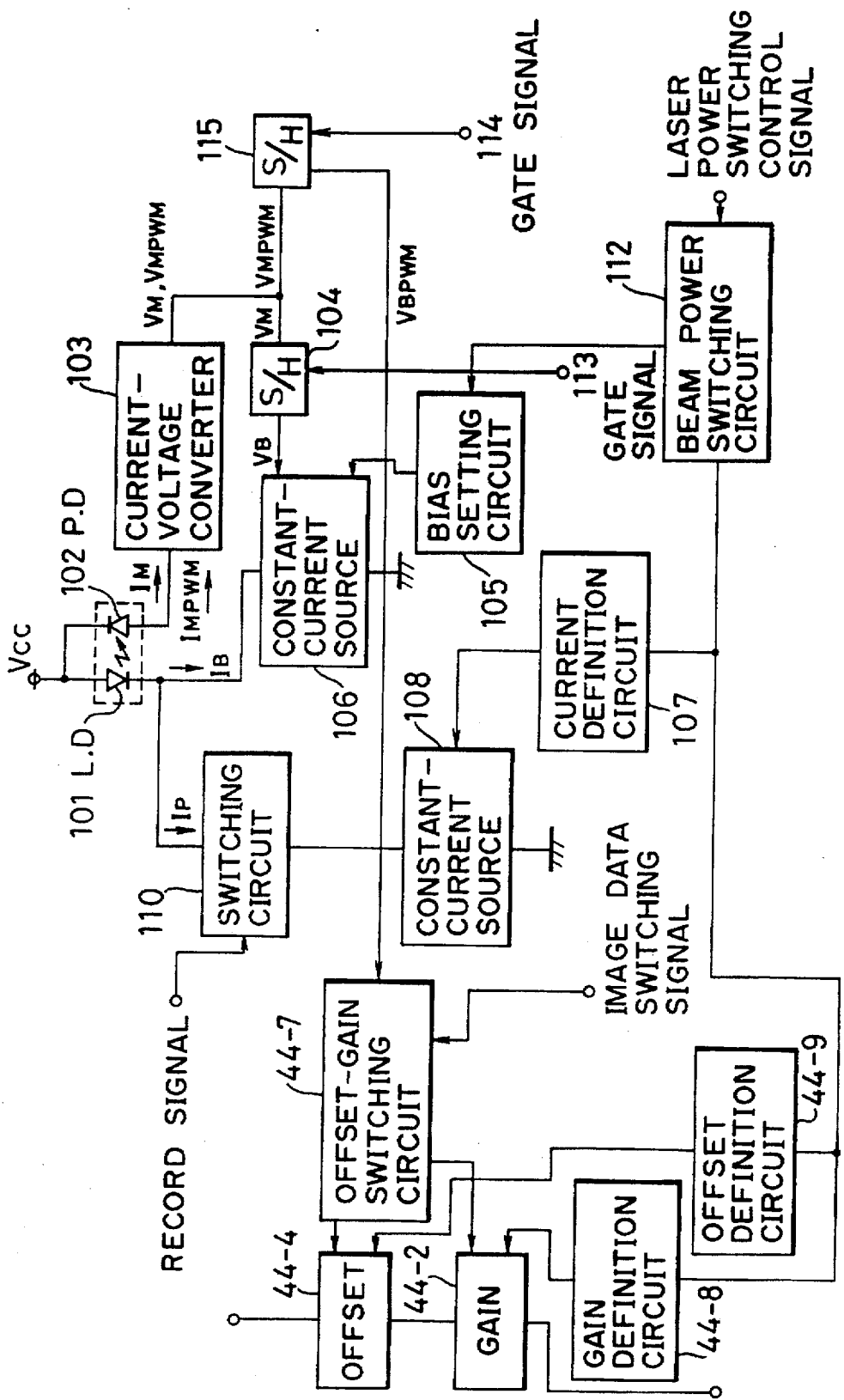
FIG. 13 is a block diagram showing a structure of a laser light-emitting quantity control circuit and its related circuits.

FIG. 13 is a block diagram showing a structure of the laser light-emitting quantity control circuit 22 in the second embodiment.

As shown in FIG. 13, set values for the active current and the bias current for the semi-conductor laser are modified based on the laser power switching control signals provided to beam power switching circuit 112 according to the determined quantity of laser light. So far, the quantity of laser light-emission is switched. At the same time, under control of the image data switching signal set values of the gain 44-8 and the offset level 44-9 of the binarization circuit are modified, and hence, the set values of the quantity of laser light-emission to be processed in the pulse width modulation, corresponding to the image data at 00H and FFH are switched. Each of the quantity of laser light-emission corresponding to image data of 00H and FFH is set according to the quantity of laser light, which is determined from necessary electric potential contrast, so that the quantity position at the linear beginning and near linear end of the characteristic curve which shows relation between the descried pulse width and the quantity of laser light. According to each of the set values the quantity of laser light-emission is so controlled in the second embodiment as in the similar manner to in the first embodiment. Detailed operations of this control method for the second embodiment are similar to the first embodiment.

By performing the controlling method of this invention, even if changing the quantity of laser light-emission, a uniform image density can be established in recording a single set of image data, and hence, a stable output image, free from change of density or gray-scale levels, can be obtained.

<The third embodiment>

Though a two-step switching of the quantity of laser light-emission is disclosed in the first and the second embodiments, the present invention can be applied to the case that a multiple-step switching of the quantity of laser light-emission is used. Even in case of a plurality of switching levels for the quantity of laser light-emission, a plurality of binarization circuits are not necessary, and hence, only by controlling the pulse width, which is designated by the input image data, correctly in response to the individual level of the quantity of laser light-emission, high-quality images can be recorded.

<The fourth embodiment>

In the first embodiment, the quantity of laser light-emission corresponding to image data at the addresses of 00H and FFH is controlled after processing in the pulse width modulation according to the record signal. It may be allowed that the quantity of laser light-emission corresponding to other addresses of, for example, 10H and 80H and so on in order to establish high quality of the linearity in a specific gray-scale area which is to be remarked or important. This way of control also makes it possible to control correctively the quantity of laser light-emission for the uniform recording density and the precise separation of gray-scale levels in the specific gray-scale level.

<Other embodiment>

In each of the described embodiments, the laser beam is emitted continuously at outside of record area in the horizontal scanning to set current value for laser and the laser beam is emitted by the signal processed with pulse width modulation to set the offset level of the triangular pulse and the bias level. In such a control process, either setting can be performed at each scanning timing, otherwise either setting can be performed by turns, either setting can be performed at common scanning timing or by turns once in a plurality of horizontal scannings, too. And either settings can be performed during vertical scanning period corresponding to a non-image area between two pages.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An image processing apparatus comprising:
   gradation processing means for processing gradation data to generate a modulation signal for modulating a beam emitted from a light source;
   bias current setting means for variably setting a bias current which is supplied to said light source; and
   condition setting means for setting a condition of said gradation processing means to correct a rising characteristic of said light source which varies depending upon the bias current variably set by said bias current setting means.

2. An image processing apparatus as claimed in claim 1, wherein said gradation processing means comprises means for comparing said gradation data with a predetermined pattern signal to generate a pulse width modulated signal.

3. An image processing apparatus as claimed in claim 2, wherein said condition setting means sets variably an offset or a gain of said pattern signal to correct the rising characteristic of said light source which varies depending upon the bias current set by said bias current setting means.

4. An image processing apparatus as claimed in claim 1, further comprising detecting means for detecting a quantity of the light emitted from said light source.

5. An image processing apparatus as claimed in claim 4, wherein said condition setting means sets the condition of said gradation processing means on a basis of an output from said detecting means when the beam from said light source is modulated by said modulation signal obtained by processing predetermined data.

6. An image processing apparatus as claimed in claim 4, wherein said bias current setting means sets the bias current on the basis of the output of said detecting means when said light source continuously emits the beam.

7. An image processing apparatus as claimed in claim 1, further comprising current setting means for variably setting a current which is supplied to said light source so that a surface potential of a photo-sensitive member which is irradiated with the beam from said light source is controlled to obtain a predetermined potential contrast characteristic.

8. An image processing apparatus as claimed in claim 7, further comprising circumstance detecting means for detecting a circumstance.

9. An image processing apparatus as claimed in claim 8, further comprising means for determining a current which is supplied to said light source on a basis of an output of said circumstance detecting means so as to enable the predetermined potential contract characteristic to be obtained.

10. An image processing apparatus as claimed in claim 7, further comprising means for detecting a quantity of the light emitted from said light source, wherein said condition setting means sets the condition of said gradation processing means on a basis of an output from said detecting means when the beam from said light source is modulated by said modulation signal obtained by processing said predetermined data.

* * * * *

UNITED STATES PATENT AND TRADEMARK OFFICE
CERTIFICATE OF CORRECTION

PATENT NO. : 5,742,323

DATED : April 21, 1998

INVENTOR(S) : Satoru Fukushima

It is certified that error appears in the above-identified patent and that said Letters Patent is hereby corrected as shown below:

Column 1, line 21, change "means that" to --measuring--;

line 23, change "feed back" to --feeding-back--; and line 25, change "Apc" to --APC--.

Column 2, line 18, change "laser light-emission" to --the laser light-emission--.

Column 3, line 28, delete "an";

line 40, change "followings," to --following,--;

line 47, delete "Selection";
       delete lines 48 to 51 in their entirety;
       line 52 delete "ITOP detector 28"; and
       line 64, change "elements" to --element--.

Column 4, line 23, change "An" to --In--;
       line 44, change "vessel Y" to --vessel "Y"--;

UNITED STATES PATENT AND TRADEMARK OFFICE
CERTIFICATE OF CORRECTION

PATENT NO. : 5,742,323

DATED : April 21, 1998

INVENTOR(S) : Satoru Fukushima

It is certified that error appears in the above-identified patent and that said Letters Patent is hereby corrected as shown below:

Column 5, line 39, delete "-0"; and
line 42, change "curve AA" to --curve "AA"--.

Column 6,
line 38, change "versus -the" to --current versus the--.

Column 7, line 41, change "correctively" to --correctly--.

Column 8, line 37, change "(VD-VL)" to --$(V_D-V_L)$--; and
line 39, change "(VD-VL)" to --$(V_D-V_L)$--.

Column 9, line 9, delete "in".

Column 10, line 15, change "descried" to --described--;
line 52, change "correctively" to --correctly--; and
line 66, change "settings" to --setting--.

UNITED STATES PATENT AND TRADEMARK OFFICE
CERTIFICATE OF CORRECTION

PATENT NO. : 5,742,323

DATED : April 21, 1998

INVENTOR(S) : Satoru Fukushima

It is certified that error appears in the above-identified patent and that said Letters Patent is hereby corrected as shown below:

Claim 9, column 12, line 25, change "contract" to --contrast--.

Signed and Sealed this

Twenty-third Day of March, 1999

Attest:

Q. TODD DICKINSON

*Attesting Officer*     *Acting Commissioner of Patents and Trademarks*